United States Patent

Hicks et al.

[11] Patent Number: 5,864,341
[45] Date of Patent: Jan. 26, 1999

[54] INSTRUCTION DISPATCH UNIT AND METHOD FOR DYNAMICALLY CLASSIFYING AND ISSUING INSTRUCTIONS TO EXECUTION UNITS WITH NON-UNIFORM FORWARDING

[75] Inventors: Troy Neal Hicks, Round Rock; Hung Qui Le, Austin; John Stephen Muhich, Austin; Steven Wayne White, Austin, all of Tex.

[73] Assignee: International Business Machines Corporation, Armonk, N.Y.

[21] Appl. No.: 761,875

[22] Filed: Dec. 6, 1996

[51] Int. Cl.[6] ............................................. G06F 9/30
[52] U.S. Cl. .................................................. 395/390
[58] Field of Search .................................. 395/390, 391, 395/393, 800.23

[56] References Cited

U.S. PATENT DOCUMENTS

| | | | |
|---|---|---|---|
| 3,229,260 | 1/1966 | Falkoff | 395/390 |
| 3,351,918 | 11/1967 | Levy | 395/390 |
| 4,128,880 | 12/1978 | Cray, Jr. | 395/800.04 |
| 4,903,196 | 2/1990 | Pomerene et al. | 395/391 |
| 5,057,840 | 10/1991 | Grohoski et al. | 395/800.23 |
| 5,269,007 | 12/1993 | Hanawa et al. | 395/391 |
| 5,276,821 | 1/1994 | Imai et al. | 395/390 |
| 5,519,864 | 5/1996 | Martell et al. | |

FOREIGN PATENT DOCUMENTS

| | | |
|---|---|---|
| 0730224A | 4/1996 | European Pat. Off. . |
| 0767425a | 4/1996 | European Pat. Off. . |
| 97/25670 A1 | 7/1997 | WIPO . |

*Primary Examiner*—Richard L. Ellis
*Attorney, Agent, or Firm*—Raymond M. Galasso; Kelly K. Kordzik; Anthony V.S. England

[57] ABSTRACT

The present invention is directed to a method and apparatus for dispatching instructions in an information handling system. A pre-execution queue stores instructions, and at least one execution cluster is operably coupled to the pre-execution queue. An execution cluster comprises an early execution unit for executing a first instruction dispatched from the pre-execution queue to generate and forward a first result and a late execution unit for executing a second instruction dispatched from the pre-execution queue to generate and forward a second result after the first execution unit forwards the first result. The invention further includes circuitry operably associated with the pre-execution queue, and a method for prioritizing the order in which the instructions in the pre-execution queue are dispatched to the execution cluster.

6 Claims, 6 Drawing Sheets

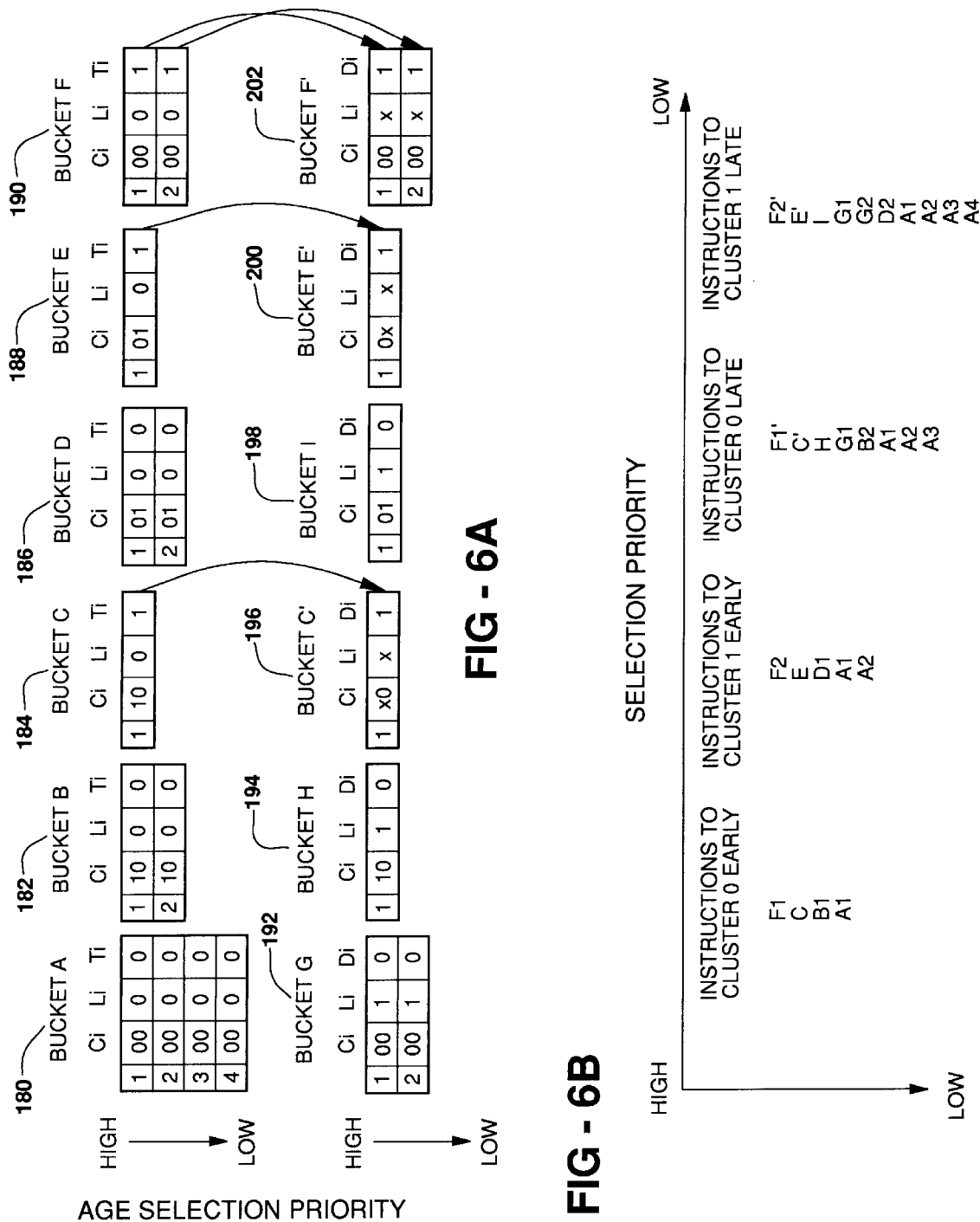

INSTRUCTION DISPATCH UNIT AND METHOD FOR DYNAMICALLY CLASSIFYING AND ISSUING INSTRUCTIONS TO EXECUTION UNITS WITH NON-UNIFORM FORWARDING

FIELD OF THE INVENTION

The present invention relates to information handling systems and methods for operating information handling systems and, more particularly, to apparatuses and methods for dispatching instructions to one or more units in an information handling system.

BACKGROUND OF THE INVENTION

Forwarding data between multiple execution units in a super scalar design has been a problem which often limits the cycle time of the design. The result bus from each unit or the cache must be forwarded to other execution units, the GPR/FPR register files, the SPRs, other implementation dependent queues, and reservation stations or rename buffers. In current designs, the result busses are forwarded uniformly to all destinations (i.e., results are made available to all destinations in the same cycle). Uniform forwarding of data to all destinations results in heavy bus loading which becomes a critical performance degradation factor, either by limiting the cycle time or delaying the forwarding of data. This invention describes a non-uniform forwarding of data, as well as an instruction queuing and issuing mechanism to utilize all the execution units effectively.

SUMMARY OF THE INVENTION

Accordingly, the present invention is directed to an apparatus for dispatching instructions in an information handling system. The apparatus comprises a pre-execution queue for storing instructions and at least one execution cluster operably coupled to the pre-execution queue comprising an early execution unit for executing a first instruction dispatched from the pre-execution queue to generate and forward a first result and a late execution unit for executing a second instruction dispatched from the pre-execution queue to generate and forward a second result after the first execution unit forwards the first result. The apparatus further includes circuitry operably associated with the pre-execution queue for prioritizing the order in which the instructions in the pre-execution queue are dispatched to the execution cluster.

The present invention also includes a method for dispatching instructions in an information handling system comprising a pre-execution queue for storing instructions and at least one execution cluster operably coupled to the pre-execution queue comprising an early execution unit for executing a first instruction dispatched from the pre-execution queue to generate and forward a first result and a late execution unit for executing a second instruction dispatched from the pre-execution queue to generate and forward a second result after the first execution unit forwards the first result. The method comprises the steps of storing instructions in the pre-execution queue and prioritizing the order in which instructions in the pre-execution queue are dispatched to the execution cluster.

It is an advantage of the present invention that the non-uniform forwarding of data enhances system performance time due to the decreased amount of data forwarded on the system bus. It is a further advantage of the present invention that an instruction queuing and issuing mechanism ensures that all execution units are used effectively.

BRIEF DESCRIPTION OF THE DRAWINGS

FIG. 6A shows the logical sequence of the classification performed by the apparatus of FIG. 5.

FIG. 6B depicts a logical selection table as used in the logical sequence of FIG. 6A.

DETAILED DESCRIPTION OF A PREFERRED EMBODIMENT OF THE INVENTION

The preferred embodiment describes an implementation that supports the Fixed Point Unit of the Power PC architecture (Power PC is a trademark of International Business Machines Corp.). The same scheme can be adapted to support other execution units as well as other architectures.

Figure 1:
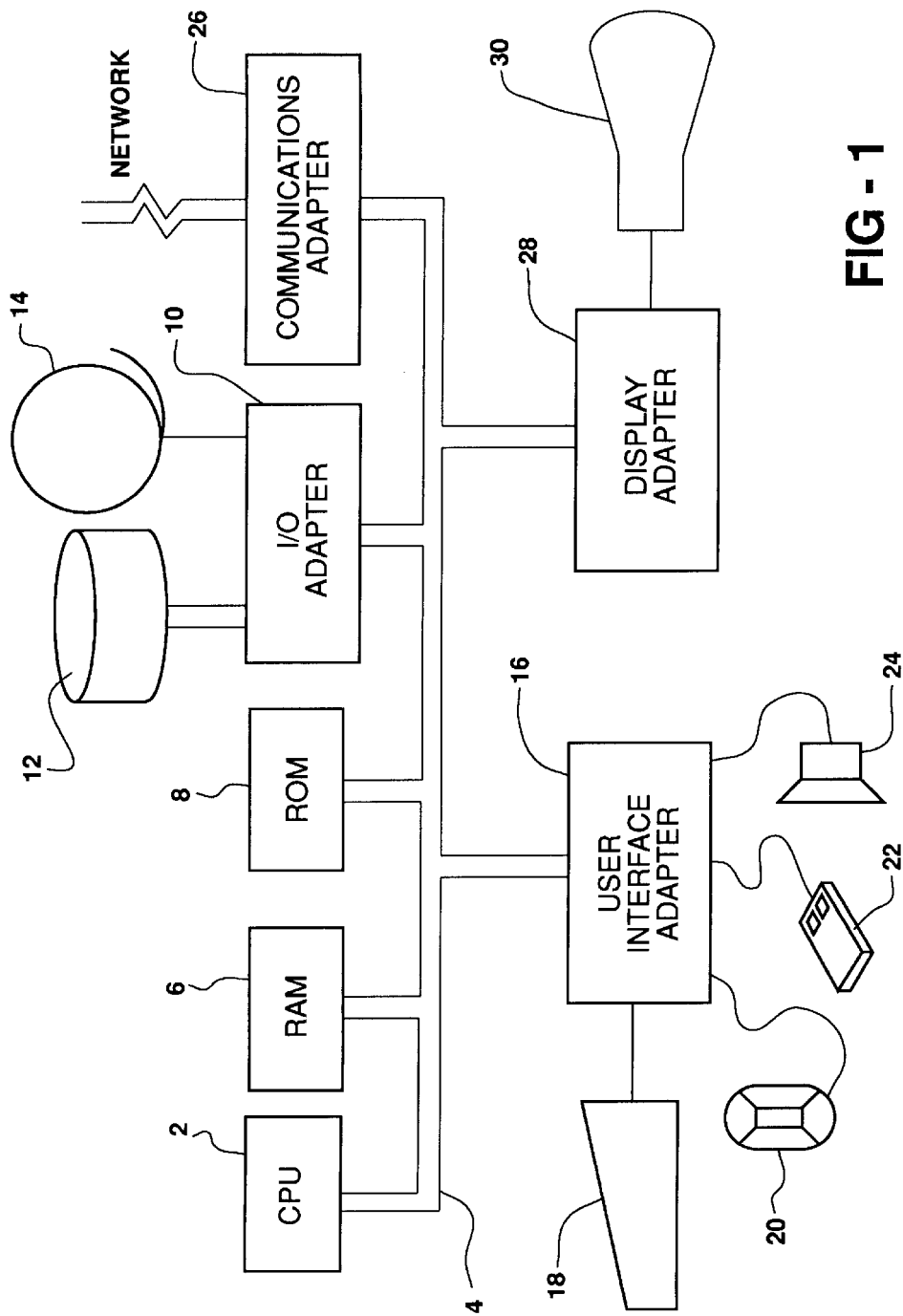
FIG. 1 is a block diagram of an information handling system embodying the present invention.

A typical information handling system is depicted in FIG. 1 and includes at least one central processing unit (CPU) 2. CPU 2 is interconnected via system bus 4 to random access memory (RAM) 6, read only memory (ROM) 8, and input/output (I/O) adapter 10 for connecting peripheral devices such as disc units 12 and tape drives 14 to bus 4, user interface adapter 16 for connecting keyboard 18, mouse 22, speaker 24, microphone 20, and/or other user interface devices such as a touch screen device (not shown) to bus 4, communication adapter 26 for connecting the information handling system to a data processing network, and display adapter 28 for connecting bus 4 to display device 30.

Figure 2:
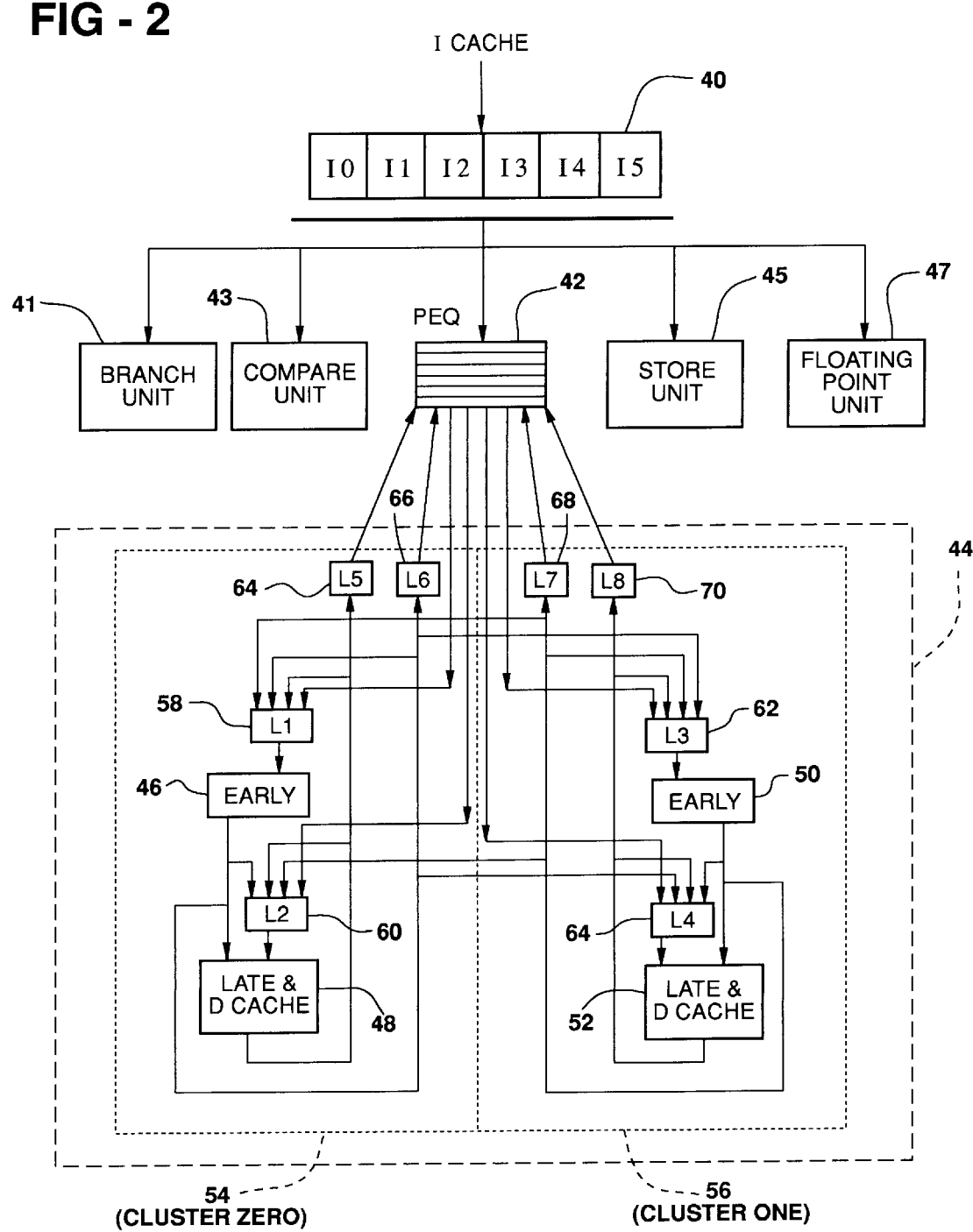
FIG. 2 is a block diagram of the architecture of a system embodying the present invention, including a high-level view of the instruction queue, the pre-execution queue, and the fixed point unit.

FIG. 2 shows a high level overview of a CPU 2, comprising an instruction queue 40, a pre-execution queue (PEQ) 42, a fixed point unit 44, a branch unit 41, a compare unit 43, a store unit 45, and floating point unit 47. Fixed point unit 44 consists of four execution units, 46, 48, 50, and 52, which are arranged in two clusters, cluster zero 54 and cluster one 56. Each cluster 54, 56 has an early execution unit 46, 50 and a late execution unit 48, 52. To avoid timing problems with forwarding data to multiple destinations, the results from each execution unit 46, 48, 50, 52 are forwarded non-uniformly depending on the location of the destination and the time when the result is available.

The instructions in the instruction queue come from an instruction cache or other memory units (not shown). Instructions are gated into PEQ 42, which holds instructions and data to be sent to the clusters 54, 56. Instructions and data are sent from PEQ 42 to latches L1 58, L2 60, L3 62, and L4 64. Instructions and data are gated from the latches into the execution units. For example, instructions and data are gated from latch 58 into execution unit 46. Any result from an execution unit 46, 48, 50, 52 may also be sent to any latch L1 58, L2 60, L3 62, or L4 64 for further processing by the execution unit associated with the particular latch. Latches L5 64, L6 66, L7 68, and L8 70 receive the results from each execution unit 46, 48, 50, 52 and then send these results back to PEQ 42 for further processing.

Fixed point clusters 54, 56 have the following characteristics. The early unit in a cluster can forward the result to the late unit in the same cluster to be used in the same cycle. For example, an instruction executing in early unit 46 in cycle n can forward the result to late unit 48 in the same cluster 54 so that a dependent instruction can use that result and execute in late unit 48 in cycle n (0 cycle forwarding). The late unit in a cluster can forward the result to the early unit in the same cluster so that the result is available for execution in the early unit during the cycle after the result is generated (one cycle forwarding within a cluster). For example, an instruction executing in late unit 48 in cycle n can forward the result to early unit 46 in the same cluster 54 so that a dependent instruction can use that result and execute in early unit 46 in cycle n+1.

The early unit in a cluster (local cluster) can forward the result to the execution units in another cluster (remote cluster) so that the result is available for execution in the remote cluster during the cycle after the result is generated. For example, an instruction executing in early unit 46 of local cluster 54 in cycle n can forward the result to either early unit 50 or late unit 52 of remote cluster 56 so that a dependent instruction can use that result and execute in early unit 50 or late unit 52 in cycle n+1.

The late unit in a local cluster can forward the result to the execution units of a remote cluster one cycle after the result is generated (two cycle forwarding between clusters). For example, an instruction executing in late unit 48 of local cluster 54 in cycle n can forward the result to either early unit 50 or late unit 52 of remote cluster 56 so that a dependent instruction can use that result and execute in early unit 50 or late unit 52 in cycle n+2.

All units in the clusters can forward the result to the GPR (not shown) and PEQ 42 one cycle after the result is generated (two cycle forwarding).

A load instruction can only execute in the late unit of a cluster.

To keep all units in the clusters operating efficiently, the instruction issuing unit, PEQ 42, must take into account the non-uniform forwarding of the result data by the execution units within and between the clusters when scheduling instructions to the clusters. In addition, PEQ 42 must schedule only instructions of operands which are available. However, out-of-order issuing is allowed.

PEQ 42 must also provide a fast recovery method in the case that speculative instructions are scheduled and aborted. For example, instructions may be scheduled on the assumption that a particular branch will take a certain path, and instead the branch takes an alternate path. There is also the possibility that an exception will occur between two scheduled instructions.

In addition, PEQ 42 must only schedule certain instructions, such as load instructions to the late units. Finally, PEQ 42 must implement the above features in a simplified way to meet the cycle time of the processor.

The instruction queuing and issuing mechanism has the following features. PEQ 42 acts as a reservation station, and holds instructions and their data to be issued to the clusters 54,56. A set of latches implementing a priority array (shown in FIGS. 3 and 5), keeps track of the relative ages of instructions in PEQ 42. A set of bits in PEQ 42 is used to indicate that operands are available for an instruction. Only instructions with available operands are selected by PEQ 42 to be issued to clusters 54,56.

Another set of bits in PEQ 42 allows dependent instructions to be "paired," i.e., instructions A and B are paired if instruction A is not a load and instruction A generates the result that instruction B uses. PEQ 42 will try to issue the pair AB together to the same cluster (A to the early unit and B to the late unit) to take advantage of the early to late unit 0 cycle forwarding.

Still another set of bits in PEQ 42 keeps track of where the result is being generated so that a dependent instruction that uses that result will be issued to the proper cluster. For example, if instruction A is executing in late unit 48 of cluster zero 54, PEQ 42 will try to issue instruction B, which is dependent on A, to cluster zero 54 to take advantage of the one cycle forwarding of data within a cluster.

An instruction classification scheme groups instructions into buckets. The instruction selection logic operates on each bucket concurrently. The instruction selection time is improved as the instruction selection process is changed from selecting instructions sequentially to selecting instructions from buckets in parallel. For example, assume instruction A is executing in early unit 46 of cluster zero 54 in cycle n. Instruction B which depends on A can execute in late unit 48 of cluster zero 54 in cycle n. B can execute in any of the four units 46, 48, 50, 52 in cycle n+1 or afterward.

As another example, assume instruction A is executing in late unit 48 of cluster zero 54 in cycle n. Instruction B, which depends on A, can execute in either execution unit 46, 48 of cluster zero 54 in cycle n+1. B can execute in any of the four units 46, 48, 50, 52 in cycle n+2 or afterward.

Figure 3:
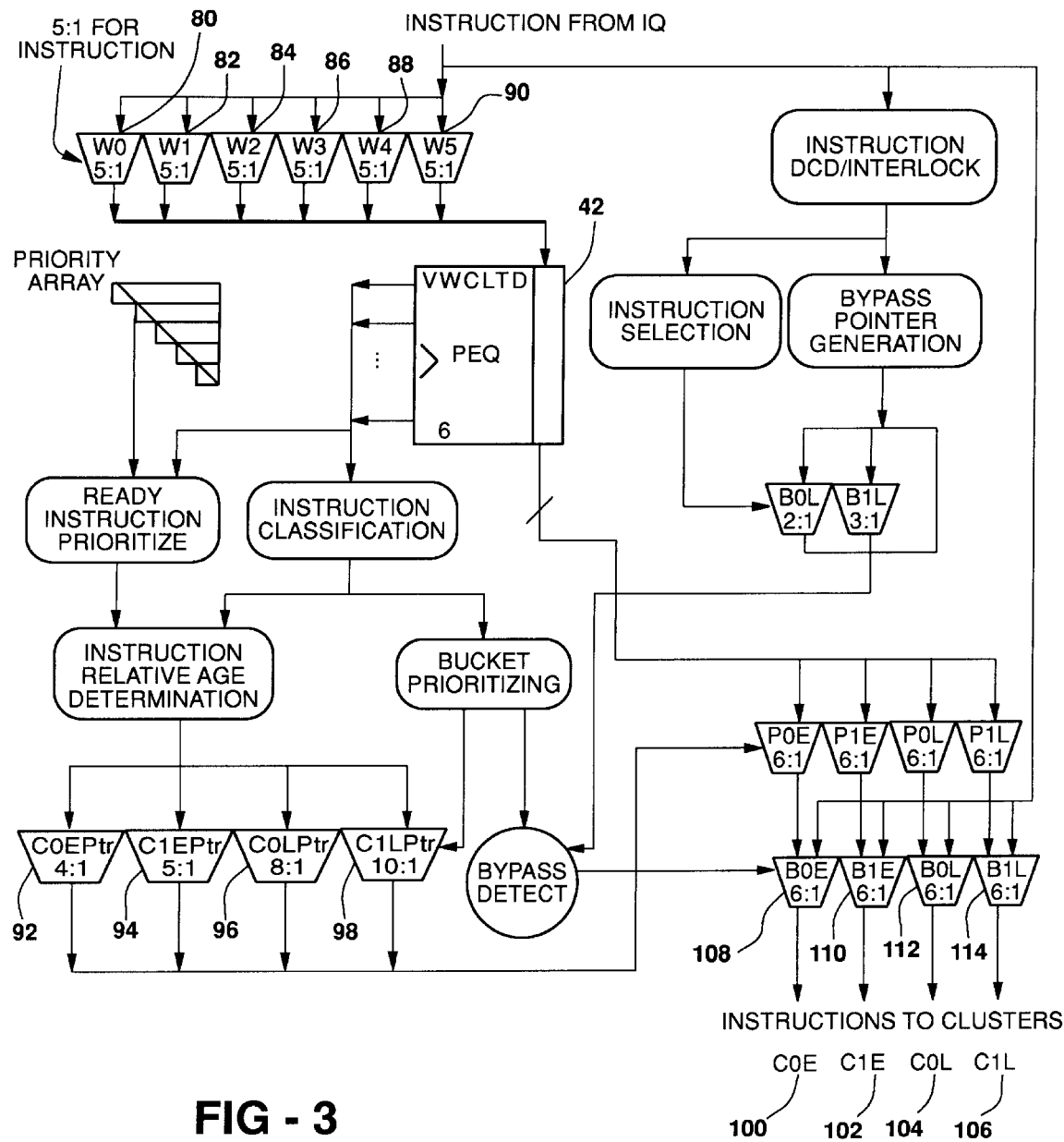
FIG. 3 is a block diagram of an apparatus for dispatching instructions according to the present invention.

FIG. 3 shows the instruction flow through PEQ 42. Instructions are dispatched from Instruction Queue (IQ) 40, shown in FIG. 2. They are gated into PEQ 42 through multiplexers 80, 82, 84, 86, 88, 90. Controls for instruction selection are calculated and gated through four multiplexers: C0Eptr 92, C1Eptr 94, C0Lptr 96, and C1Lptr 98. Instructions from PEQ 42 are gated out through four buses: C0E 100 (to cluster zero early unit 46), C1E 102 (to cluster one early unit 50), C0L 104 (to cluster zero late unit 48), and C1L 106 (to cluster one late unit 52). If there is no available instruction in PEQ 42, then dispatched instructions can be bypassed directly to execution units 46, 48, 50, 52 through four multiplexers: B0E 108, B1E 110, B0L 112, and B1L 114.

Figure 4:
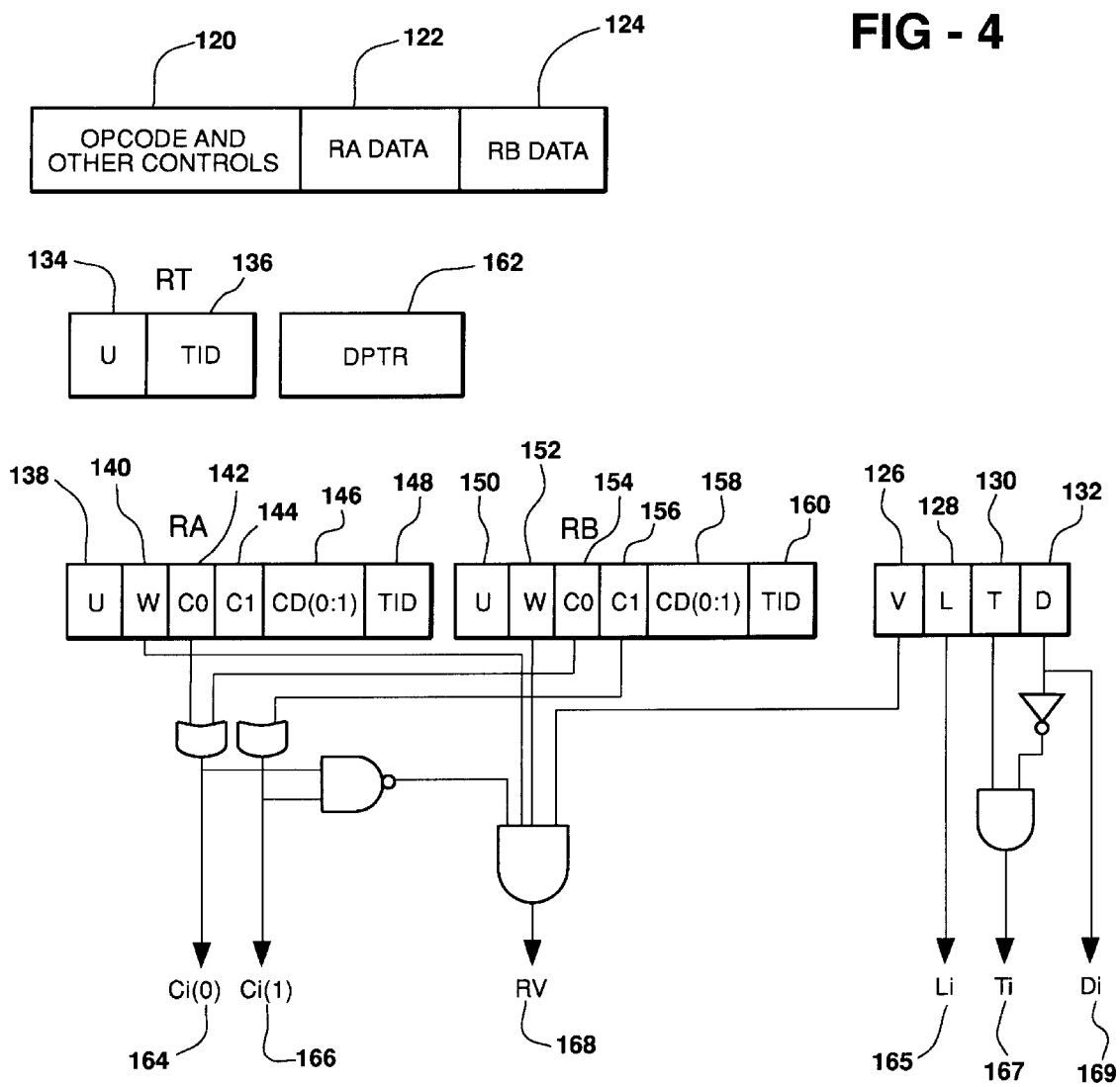
FIG. 4 is a diagram of an instruction and its associated status bits according to the present invention.

FIG. 4 shows the fields for each entry of PEQ 42. Each entry consists of an opcode and other controls 120, RA data 122, and RB data 124. Bits that are associated with each PEQ entry are as follows:

V 126: indicates whether entry is valid.

L 128: indicates whether instruction is a load instruction.

T 130: indicates whether instruction is the earlier (target) instruction of a dependent pair instruction. (Note that if an instruction is a dependent instruction, it is not treated as the target instruction. However, if it becomes an independent instruction, i.e., its D 132 bit is reset, and if its T 130 bit is set, then it automatically becomes the target instruction).

D 132: indicates whether instruction is the later instruction (depends on a target instruction) of a dependent pair.

RT (instruction target is GPR):
   U 134: indicates whether field is valid
   TID 136: indicates target ID of GPR to which instruction will be sent. TID 136 is the pointer to be used for operand interlock. TID 136 also is the instruction identifier.

RA (instruction source is GPR):
   U 138: indicates whether field is valid
   W 140: indicates whether RA field is loaded (if RA is not used, this bit is set to 1 at dispatch).

C0 142, C1 144: indicates whether operand is dependent on the instruction being executed in the late unit of the cluster (bit 0 for cluster zero, bit 1 for cluster one). These bits are active for one cycle to steer this instruction to the unit that has the data.

CD 146: C0 142, C1 144 bits delayed by a cycle. PEQ 42 uses CD 146 to reset the W bit 140 if data is canceled.

TID 148: the target ID of the GPR which will provide the necessary instruction.

RB (instruction source is GPR):

U 150: indicates whether field is valid.

W 152: indicates whether RB field is loaded (if RB is not used, this bit is set to 1 at dispatch).

C0 154, C1 156: indicates that operand is dependent on the instruction being executed in the late unit of the cluster (bit 0 for cluster zero, bit 1 for cluster one). These bits are active for one cycle to steer this instruction to the unit that has the data.

CD 158: C0 154, C1 156 bits delayed by a cycle. PEQ 42 uses CD 158 to reset W bit 152 if data is canceled.

TID 160: target ID of the GPR which will provide the necessary information.

DPTR 162: Points to the entry that contains the instruction that depends on this instruction. It is valid when the T 130 bit is active.

FIG. 4 also shows the following PEQ 42 instruction state indicators, which are the combinations of individual bits described above to specify the state of each entry in PEQ 42:

Ci(0) 164: indicates that instruction is dependent on the instruction being executed in late unit 48. This bit is the "OR" of the C0 bits 142, 154 of the two operands.

Ci(1) 166: indicates that instruction is dependent on the instruction being executed in late unit 52. This bit is the "OR" of the C1 bits 144, 156 of the two operands.

RV 168: indicates that instruction is ready for execution. This bit is the combination of the two operand available bits W 140, W 152, queue entry valid bit V 126, and the two C bits 164, 166 (note that an instruction is not ready if it depends on operands that are being generated in both late units).

.Li 165: indicates that instruction is a load.

.Ti 167: indicates that instruction is the target instruction of a dependent pair instruction and is not the dependent instruction.

.Di 169: indicates that instruction is the dependent of a dependent pair instruction.

Dispatched instructions from the IQ 40, in the order of oldest to newest (IQ0 to IQ4), are gated into the lowest empty locations as indicated by PEQ valid bit V 126. The order of all entries in the six-entry deep PEQ 42 is marked by the 15-bit priority array 170, shown in FIG. 5. Each bit called "n O m" indicates that entry n is older than entry m. Entry zero 172 has five bits (0O1 through 0O5), entry one 174 has four bits (1O2 through 1O5), etc.

When instructions are dispatched, PEQ 42 is scanned for existing instructions, and priority array 170 is set to reflect the age of the instructions relative to other instructions in PEQ 42.

Dispatched instructions are checked against each other and against existing instructions in PEQ 42 to determine if they can be paired. An instruction may be paired to an older instruction being dispatched or existing in PEQ 42 if one of its source operands is the result of the older instruction (the TIDs are used to determine the interlock), and the older instruction is not a load.

When a dispatched instruction is detected to be dependent on a prior instruction, the dependent instruction's PEQ position is saved with the target instruction in the DPTR 162 field in FIG. 4. The T bit 130 of the target instruction is set, and the D bit 132 of the dependent instruction is set. If multiple instructions are dependent on the same target instruction, only the oldest dependent instruction is paired with the target instruction. If two sources of an instruction depend on two different instructions, then "pairing" is performed on the RA source of the dependent instruction only. If the target of a pair of instructions is issued and the dependent instruction is not issued (i.e., the late unit is not available), then the D bit 132 of the dependent operand is reset. This allows the dependent instruction to become an independent instruction in the next cycle.

Each source operand in PEQ 42 has an associated W (written) bit 140, 152 bit to indicate if the data for that operand is available. The W bit 140, 152 is set at dispatch if the data is in the GPR, if the source is not needed by the instruction, or if the dispatching sources match any TID being broadcast during the cycle. If the entry is the dependent instruction of a dependent pair, then the dependent source is marked as ready.

One cycle before the result appears on the earliest result bus, the TID associated with that result is broadcast to PEQ 42. It is compared against all source TIDs in PEQ 42. If there is a match, the W bit 140, 152 bit for that source field is set. When the W bit 140, 152 is set it stays set until it is overlaid with a new entry (an older instruction in the queue has been issued or canceled). It is also reset if the corresponding data which is supposed to be generated by the unit is not valid (i.e., cache miss condition).

A PEQ entry is ready for dispatch to one of the execution units 46, 48, 50, 52 if the entry is valid (V=1), it does not depend on instructions being executed in different clusters, and either it is not the dependent instruction of a dependent pair and its two source operands are ready (W=1), or it is the dependent instruction of a dependent pair and its independent source operand and the instruction it depends on are ready. This is accomplished by keeping the DPTR 162 pointing to the instruction which depends on it and setting the W bit 140, 152 of the dependent source unconditionally.

Each source operand also has a two bit C field 142, 144 or 154, 156 to indicate which, if any, late unit in the cluster is generating the data for this operand. The C field 142, 144 or 154, 156 is set when the W bit 140, 152 is set as a result of a match of the source operand TID 148, 160 and the broadcast TID from the corresponding late unit.

Figure 5:
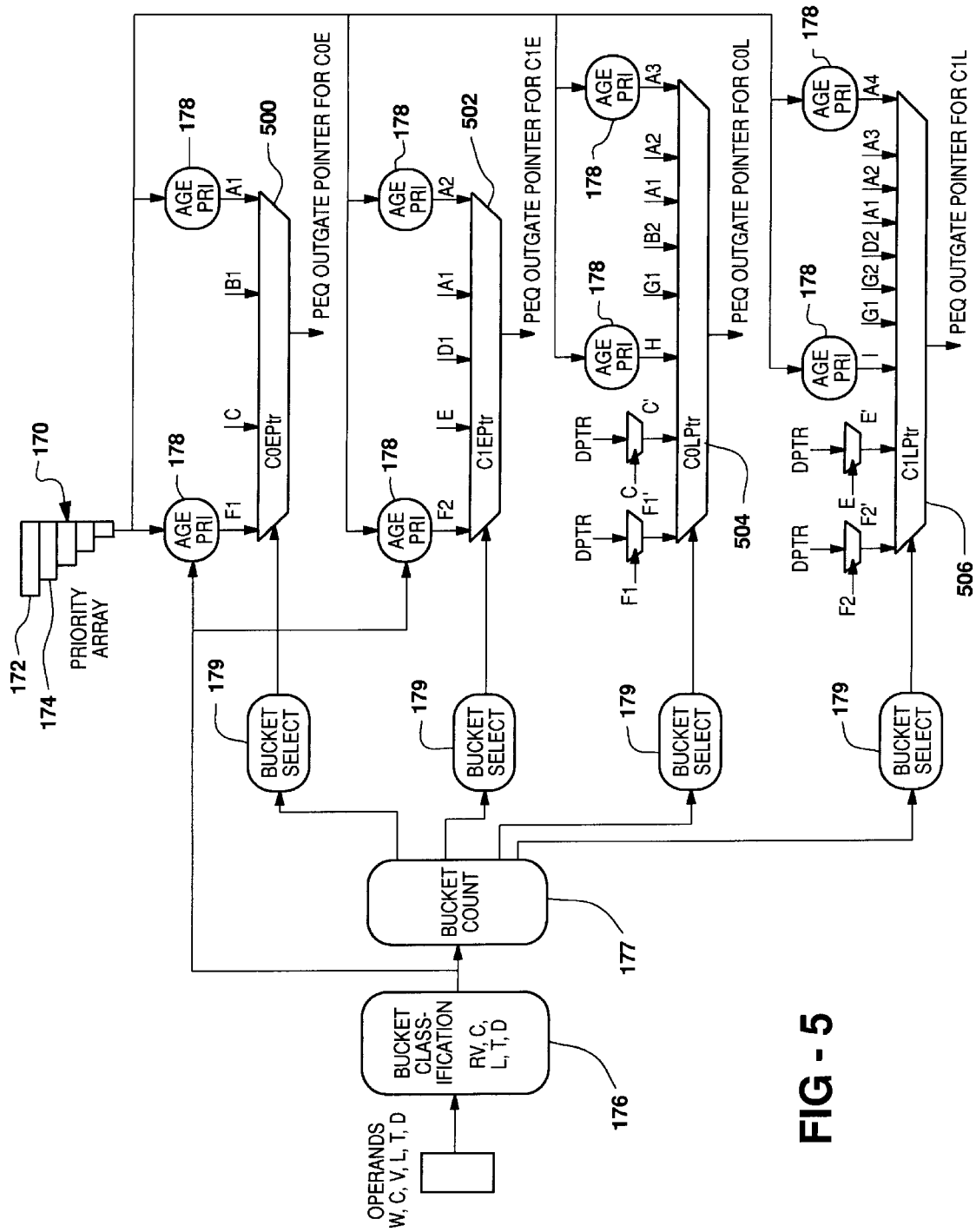
FIG. 5 is a block diagram of an apparatus for classifying instructions according to the present invention.

As shown in FIG. 5, ready instructions in PEQ 42 are classified into buckets by examining the RV, Ci, Li, Ti, Di state indicators of the instruction in each entry. FIG. 6A illustrates the different bucket types. The buckets are (see FIG. 6A):

Type A 180 (Ci=00, Li=0, Ti=0) Contains instructions that can go to either cluster, early or late unit, and are not targets for dependent pair instructions.

Type B 182 (Ci=10, Li=0, Ti=0) Contains instructions that only go to cluster zero, early or late unit, and are not targets for dependent pair instructions.

Type C 184 (Ci=10, Li=0, Ti=1) Contains instructions that only go to cluster zero, early or late unit, and are targets for dependent pair instructions.

Type D 186 (Ci=01, Li=0, Ti=0) Contains instructions that only go to cluster one, early or late unit, and are not targets for dependent pair instructions.

Type E 188 (Ci=01, Li=0, Ti=1) Contains instructions that only go to cluster one, early or late unit, and are targets for dependent pair instructions.

Type F 190 (Ci=00, Li=0, Ti=1) Contains instructions that go to either cluster, early or late unit, and are targets for dependent pair instructions.

Type G 192 (Ci=00, Li=1, Di=0) Contains instructions that can go to the late unit of either cluster and are not dependent instructions of dependent pair instructions.

Type H 194 (Ci=10, Li=1, Di=0) Contains instructions that only go to the late unit of cluster zero and are not dependent instructions of dependent pair instructions.

Type C' 196 (Ci=x0, Li=x, Di=1) Contains dependent instructions of which the targets are in group C.

Type I 198 (Ci=01, Li=1, Di=0) Contains instructions that only go to the late unit of cluster one and are not dependent instructions of dependent pair instructions.

Type E' 200 (Ci=0x, Li=x, Di=1) Contains dependent instructions of which the targets are in Group E.

Type F' 202 (Ci=00, Li=x, Di=1) Contains dependent instructions of which the targets are in group F.

FIG. 5 shows the process of selecting instructions from PEQ 42 to issue to Fixed Point unit 44. It consists of three steps:

Bucket Classification 176: group ready instructions (Rv=1) into the appropriate bucket 180–202 (see FIG. 6A).

Age prioritization 178: calculate the relative ages of the ready instructions (RV=1) in each bucket. This is accomplished by examining priority array latches 170 and generating the pointer that points to the PEQ entry that contains the instruction. For example, if the oldest ready instruction in the F bucket is in entry number 3 of PEQ 42, then the F1 input of multiplexor 500 will have a value of 3.

Bucket selection 177, 179: count the number of ready instructions within a bucket and generate the select controls to multiplexor 500, 502, 504, 506. This is accomplished by counting the number of instructions within a bucket and examining the count to generate the select controls. For example, if there is one instruction in the F bucket, at least one instruction in the E bucket, two instructions in the G bucket, and no instruction in other buckets, then the control to multiplexor 500 will select input F1, the control to multiplexor 502 will select input E, the control to multiplexor 504 will select input G1, the control to multiplexor 506 will select input G2.

FIG. 6A shows the bucket classification. The age prioritizing within each bucket is shown vertically (top to bottom for each bucket). FIG. 6B shows the logical selection table. Each column contains the candidates for each execution unit 46, 48, 50, 52, where the letter specifies the instruction bucket assigned to each execution unit 46, 48, 50, 52, and the number specifies the relative age of the instruction within a particular bucket. Only one instruction per column can be selected. The selection priority is from left to right and top to bottom. For example, if A1 (this notation refers to the oldest instruction in bucket A) is selected for cluster zero early unit 46, then from bucket A only A2 may be selected for cluster one early unit 50.

Preferably, the maximum number of instructions in each bucket matches the number of execution units. For example, bucket A (180 in FIG. 6A) has four instructions which can go to any of the four execution units 46, 48, 50, 52, bucket C (184 in FIG. 6A) has two instructions since they must go to cluster zero which has only two execution units 46, 48. By doing so, this invention allows an implementation of a "deep" PEQ, i.e., a PEQ having more entries than the number of execution units, while confining the selection process to a manageable number of instructions within each bucket.

Table 1, "Program Example," shows an instruction sequence sample. Table 2, "PEQ Dynamic Instruction Selection Example," shows how the instruction sequence from Table 1 passes through the PEQ 42. Column 1 specifies the cycle (time advances from cycle 0 to 5), column 2 specifies the instruction tag, column 3 specifies the instruction in PEQ 42, column 4 specifies the instruction buckets, column 5 specifies the units that the instruction is issued to, column 6 specifies where the instructions are executed.

Note that as instructions are issued and executed, the state bits in PEQ 42 change dynamically and the instructions are dynamically reassigned into different buckets with different relative age. This is caused by instruction interaction at execution, such as with issued priority conflicts (i.e., instruction 18 in cycle 3), conditions that cause delay in execution (cache miss, multi-cycle operations), mispredicted branch instructions, or interrupts. Also note that store instructions and branch instructions are issued to their respective queues and do not appear in PEQ 42.

Although the present invention and its advantages have been described in detail, it should be understood that various changes, substitutions and alterations can be made herein without departing from the spirit or scope of the invention as defined in the appended claims.

TABLE 1

Program Example

| I tag (sequence from top to bottom) | instruction<br>* = fixed point operation<br>( ) = Register location of operand<br>( ) Memory = memory access from address in ( ) |
|---|---|
| a | (5)←(29)*(28) |
| b | (2)←(31)*(30) |
| c | (1)←(29)*(28) |
| 1 | Store |
| 2 | (3)←(4)*(5) |
| 3 | Branch not taken |
| 4 | (6)←(8)*(5) |
| 5 | (7)←(8)*(9) |
| 6 | Store |
| 7 | (10)←(3)Memory |
| 8 | (11)←(2)Memory |
| 9 | (12)←(5)*(1) |
| 10 | Store |
| 11 | (13)←(12)*(10) |
| 12 | (14)←(13)*(10) |
| 13 | (7)←(8)*(9) |
| 14 | Store |
| 15 | (9)←(12)Memory |
| 16 | (10)←(3)Memory |
| 17 | (15)←(7)*(5) |
| 18 | (16)←(15)*(7) |
| 19 | (17)←(18)*(19) |
| 20 | (20)←(21)*(22) |

TABLE 2

PEQ Dynamic Instruction Selection Example

| Cycle | I Tag | Instruction in PEQ | Bucket | Issue to | Cluster execute C0E/C0L | C1E/C1L | Comment |
|---|---|---|---|---|---|---|---|
| 0 | a | (5)←(29)*(28) | F1 | C0E | | | Instructions a and 2 are paired across 2 |
| | b | (2)←(31)*(30) | A1 | C1E | | | instructions and issued together (0 cycle |
| | c | (1)←(29)*(28) | A2 | C1L | | | forwarding) |
| | 2 | (3)←(4)*(5) | F'1 | C0L | | | |
| 1 | 4 | (6)←(8)*(5) | A1 | C0E | a/2 | b/c | Instruction 4 is classified as A1 (not B1) |
| | 5 | (7)←(8)*(9) | A2 | C1E | | | because instruction a (which 4 depends on) |
| | 6 | (10)← | H1 | C0L | | | is executed in the early unit (1 cycle for- |
| | 7 | (3)Memory | G1 | C1L | | | warding) |
| | 8 | (11)← | | | | | Instruction 7 is a load and depends on in- |
| | | (2)Memory | | | | | struction 2 so it is issued to cluster 0 (1 |
| | | | | | | | cycle forwarding within cluster) |
| 2 | 9 | (12)←(5)*(1) | A1 | C1E | 4/7 | 5/8 | Instructions 11 and 12 are paired and issued |
| | 11 | (13)←(12)*(10) | C1 | C0E | | | to cluster 0 because they depend on instruc- |
| | 12 | (14)←(13)*(10) | C'1 | C0L | | | tion 7 which is executing in cluster 0. |
| | 13 | (7)←(8)*(9) | A2 | C1L | | | |
| 3 | 15 | (9)← | G1 | C0L | 11/12 | 9/13 | Even though instruction 18 is ready, it is |
| | 16 | (12)Memory | G2 | C1L | | | not issued because instruction 16 is selected |
| | 17 | (10)← | D1 | C1E | | | to the late unit of cluster 1 already (G2 has |
| | 18 | (3)Memory | D2 | — | | | higher priority than D2). Instruction 19 is |
| | 19 | (15)←(7)*(5) | A1 | C0E | | | selected instead (out of order issued due to |
| | | (16)←(15)*(7) | | | | | different bucket). |
| | | (17)←(18)*(19) | | | | | |
| 4 | 20 | (20)←(21)*(22) | A2 | C1E | 19/15 | 17/16 | Instruction 18 changes from bucket D2 to |
| | | | | | | | A1 dynamically and is issued to the early |
| | | | | | | | unit of cluster 0. |
| | 18 | (16)←(15)*(7) | A1 | C0E | | | |
| 5 | | | | | 18/— | 20/— | |

What is claimed is:

1. An apparatus for dispatching instructions in a information handling system, said apparatus comprising:
    a pre-execution queue for storing instructions;
    at least one execution cluster operably coupled to said pre-execution queue comprising an early execution unit for executing a first instruction dispatched from said pre-execution queue to generate and forward a first result and a late execution unit for executing a second instruction dispatched from said pre-execution queue to generate and forward a second result after said first execution unit forwards said first result;
    means operably associated with said pre-execution queue for prioritizing the order in which instructions in said pre-execution queue are dispatched to said execution cluster; and
    means for prioritizing a plurality of buckets such that the order in which instructions in said pre-execution queue are dispatched is prioritized according to which of said buckets the instruction is grouped in.

2. The apparatus, as recited in claim 1, further including means for prioritizing instructions in a particular bucket according to the age of the instruction so that the oldest instruction in a selected entry in the particular bucket is dispatched to said execution unit assigned to said selected entry.

3. The apparatus, as recited in claim 2, further including means for prioritizing the plurality of buckets and prioritizing instructions in said plurality of buckets by age in parallel.

4. A method for dispatching instructions in an information handling system including at least one execution cluster operably coupled to a pre-execution queue comprising an early execution unit to executing a first instruction dispatched from the pre-execution queue to generate and forward a first result in a late execution unit for executing a second instruction dispatched from the pre-execution queue to generate and forward a second result after the first execution unit forwards the first result, said method comprising the steps of:
    storing instructions in the pre-execution queue; and
    prioritizing order in which the instructions in the pre-execution queue are dispatched to the execution clusters, wherein said step of prioritizing includes the step of prioritizing a plurality of buckets such that the order in which instructions in the pre-execution queue are dispatched is prioritized according to which of the plurality of buckets the instructions in grouped in.

5. The method, as recited in claim 4, wherein said step of prioritizing includes the step of prioritizing instructions in a particular bucket according to the age of the instruction so that the oldest instruction in a selected entry in the particular bucket is dispatched to the execution unit assigned to the selected entry.

6. The method, as recited in claim 5, wherein said steps of prioritizing the plurality of buckets and prioritizing instructions are performed in parallel.

* * * * *

UNITED STATES PATENT AND TRADEMARK OFFICE
CERTIFICATE OF CORRECTION

PATENT NO. : 5,864,341
DATED : Jan. 26, 1999
INVENTOR(S) : Hicks et al.

It is certified that error appears in the above-identified patent and that said Letters Patent is hereby corrected as shown below:

On the title page item [22], Filed: after "Dec." please delete [6] and insert 9; and Column 10, Line 42, after "early execution unit", delete "to" and insert --for--.

Signed and Sealed this

Twenty-eighth Day of November, 2000

*Attest:*

*Attesting Officer*

Q. TODD DICKINSON

*Director of Patents and Trademarks*